(12) United States Patent
Krishnaswamy et al.

(10) Patent No.: US 12,436,937 B2
(45) Date of Patent: Oct. 7, 2025

(54) SYSTEM AND METHOD FOR INCREASED TRANSACTION THROUGHPUT AND IMPROVED RESPONSE TIME UNDER HIGH CONTENTION

(71) Applicant: Oracle International Corporation, Redwood Shores, CA (US)

(72) Inventors: Vasudha Krishnaswamy, Fremont, CA (US); Dieter Gawlick, Palo Alto, CA (US); Tirthankar Lahiri, Palo Alto, CA (US); Weiwei Gong, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 18/223,822

(22) Filed: Jul. 19, 2023

(65) Prior Publication Data

US 2024/0126741 A1  Apr. 18, 2024

Related U.S. Application Data

(60) Provisional application No. 63/416,341, filed on Oct. 14, 2022, provisional application No. 63/416,195, filed on Oct. 14, 2022.

(51) Int. Cl.
*G06F 16/23* (2019.01)
(52) U.S. Cl.
CPC ...... *G06F 16/2343* (2019.01); *G06F 16/2379* (2019.01)
(58) Field of Classification Search
CPC .......................... G06F 16/2343; G06F 16/2379
See application file for complete search history.

(56) References Cited

U.S. PATENT DOCUMENTS

| | | | |
|---|---|---|---|
| 7,904,434 B2 | 3/2011 | Yalamanchi et al. | |
| 2009/0077135 A1* | 3/2009 | Yalamanchi | G06F 16/2336 |
| 2019/0042615 A1* | 2/2019 | Wang | G06F 9/466 |
| 2022/0391240 A1* | 12/2022 | Aithal | G06F 16/188 |

OTHER PUBLICATIONS

Yalamanchi, Aravind, et al., "Compensation-Aware Data Types in Rdbms", SIGMOD'09, pp. 931-938, https://doi.org/10.1145/1559845.1559950, Jun. 2009, 7pgs.

* cited by examiner

*Primary Examiner* — Charles Rones
*Assistant Examiner* — Xiaoqin Hu
(74) *Attorney, Agent, or Firm* — Hickman Becker Bingham Ledesma LLP; Stephen J. Walder, Jr.

(57) ABSTRACT

A Lock-Free Reservation mechanism is provided. When a transaction issues an update that affects a value in a "reservable column" of a row, the database server does not immediately obtain a lock that covers the row. Instead, the database server adds a reservation to a reservation journal. At the time the transaction commits, a lock is obtained and the requested update is made. In one implementation, before adding the reservation to the reservation journal, the database server determines whether making the update would violate any constraints involving the reservable column. In one implementation, the constraint check not only takes into account the current value of the data item that is being updated and the amount of the update, but also pre-existing reservations in the reservation journal that affect the same data item.

33 Claims, 8 Drawing Sheets

Lockfree Reservations: Replaces long duration locks
with reservations and a very short duration lock

```
CREATE Table Account(
   ID NUMBER PRIMARY KEY,
   Name VARCHAR2(10),
   Balance NUMBER RESERVABLE
     CONSTRAINT MinBal CHECK (Balance >= 50));
```
— 202

```
BEGIN
   --Reserve 25 (item price) from balance, no lock
   UPDATE Account SET Balance = Balance - 25
   WHERE ID = 12345;
   --If reservation succeeds perform purchase
   PurchaseItem();
   -- Commit finalizes the balance update
   COMMIT; -- gets account row lock (12345)
EXCEPTION WHEN Check_Constraint_Violated
   --Indicates that the reservation failed
   THEN ROLLBACK;
END;
```
— 204

*FIG. 2*

SYSTEM AND METHOD FOR INCREASED TRANSACTION THROUGHPUT AND IMPROVED RESPONSE TIME UNDER HIGH CONTENTION

CROSS-REFERENCE TO RELATED APPLICATIONS; BENEFIT CLAIM

This application claims the benefit of Provisional Application 63/416,195, filed Oct. 14, 2022, the entire contents of which is hereby incorporated by reference as if fully set forth herein, under 35 U.S.C. § 119(e). This application also claims the benefit of Provisional Application 63/416,341, filed Oct. 14, 2022, the entire contents of which is hereby incorporated by reference as if fully set forth herein, under 35 U.S.C. § 119(e). This application is related to U.S. patent application Ser. No. 18/223,824, filed Jul. 19, 2023.

FIELD OF THE INVENTION

The present invention relates to database systems and, more specifically, to techniques for increasing transaction throughput and improving response time for updates to data items that are under high contention.

BACKGROUND

When a user shops in a virtual store, the user may put items in a virtual shopping cart. Once in the shopping cart, an item is neither sold nor is it available to other shoppers. Consequently, a system that is tracking the status of items must maintain at least three counts for each type of item: a count of items available, a count of items in the process of being sold (e.g. in shopping carts), and a count of items sold. While an inventory record for an item may have many fields, the fields that are most often subject to becoming a bottleneck/hot spot are inventory totals (e.g. account balance, or number of items in stock).

When an item is placed in a virtual shopping cart, the "available count" is decremented, and the "in-process count" is incremented. At checkout time, the "in-process count" is decremented and the "sold count" is incremented. In order to track item status in this manner, software applications become more complex. Specifically, applications need to handle the state changes that must occur when, for example, a shopping cart is abandoned. Applications must incorporate logic to put things back from the abandoned carts into the available inventory. The process of putting in-process items back into available inventory is generally referred to as "compensation".

Compensation is particularly tricky when dealing with "sagas". A saga is a sequence of transactions that are to be performed as an atomic unit. An example of a scenario in which a saga may be used is the planning of a trip. When booking a trip, a saga may have to perform several local transactions to book all the desired elements—flight, hotel, limo, concerts, etc. which may take minutes or hours.

Sagas are often long running or require human interaction. Consequently, the long-term resource holding/locking of sagas can limit concurrency. A resource that is updated by a saga can become a hot resource if a local transaction of the saga needs to hold a lock on the resource for an extended period.

A saga often encapsulates a long running business transaction which is composed of several local transactions performed at independent microservices, with or without human interaction. Each microservice comprises one or more local units of work or local transactions that are part of the same saga.

The transactions that are performed as part of a saga are referred to herein as the "local transactions" of the saga. Because a saga is to be performed as an atomic unit, if a saga fails at any point, the changes made by all local transactions prior to that point have to be undone. Since those local transactions may have already committed, undoing the changes often involves executing "compensating transactions" that counteract the changes that have been committed by local transactions prior to the point of failure.

There are recovery implications with a saga execution. For example, if there is a failure during a microservice action, the action's local transaction aborts, reverting any changes made to the service data. However, a failure of a downstream microservice action that follows other successful microservice actions of a saga may lead to the abort of the saga itself. This requires the ability to back out or compensate the changes made by the prior successful microservice actions.

In general, compensating interleaved executions may result in cascading aborts due to the premature visibility of unconfirmed data. Compensating functions need to track the dependencies to be able to transition the database into a consistent state (and in the case of sagas these dependencies need to be tracked for a long period of time until the change is confirmed). Depending on the application semantics, compensation functions may not be able to capture all the dynamics of the system and often specification of such compensating functions that are to be executed at different consistent states of the database can be tricky.

Writing compensating functions can be quite complicated and involved. It is therefore very desirable to provide a mechanism by which the compensation can happen automatically or be managed by the system, rather than requiring the user to write the compensating functions and manage them.

One technique for performing automatic compensation is described in Yalamanchi, A; Gawlick, D: Compensation-aware data types in RDBMS. SIGMOD Conference 2009: 931-938, the contents of which are incorporated herein by this reference. The Yalamanchi compensation scheme is not integrated into the database itself. Consequently, the database server is not aware of the compensation mechanism and is not able to automatically perform compensation. Because the database server is not involved in the compensation in the Yalamanchi scheme, the database server holds locks obtained by each local transaction for the entire duration of each local transaction, though not for the entire duration of the saga.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a block diagram of database instructions for making a purchase under a minimum balance constraint using one implementation of the Lock-Free Reservation techniques described herein;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Conventional Handling of Updates

Figure 1:
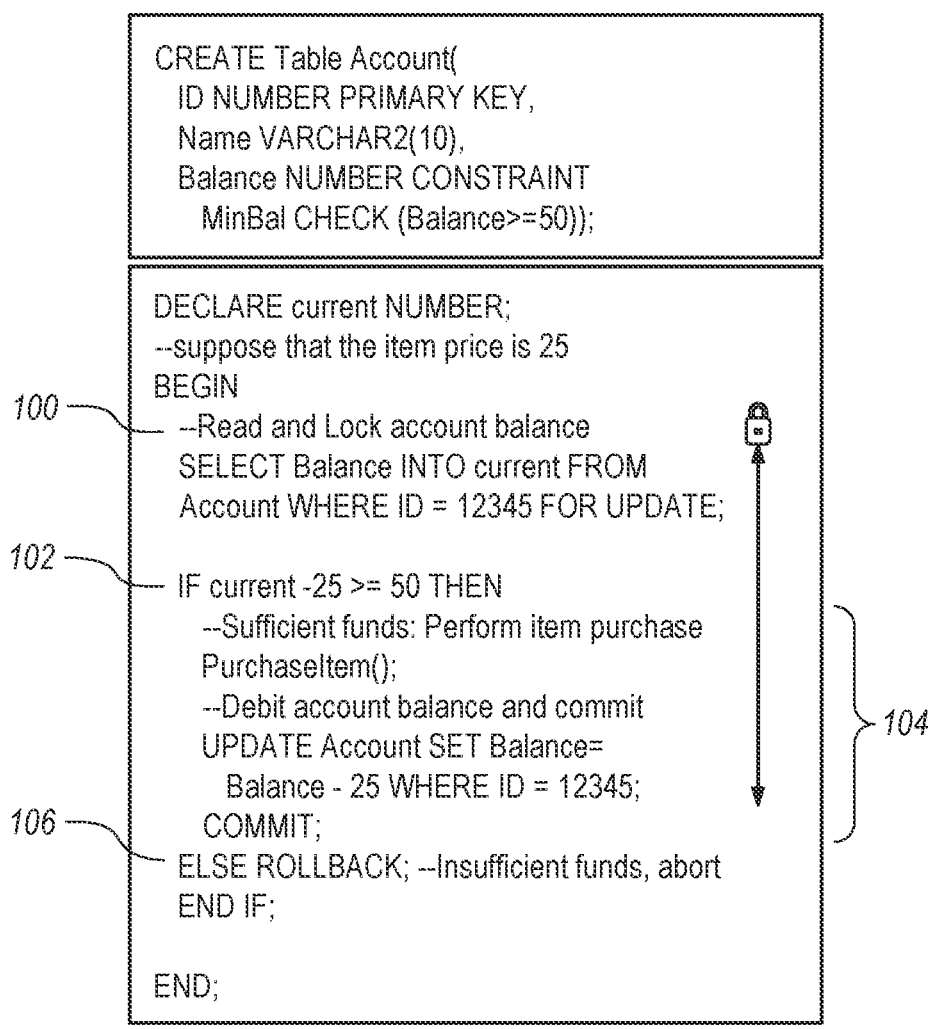
FIG. 1 is a block diagram of database instructions for making a purchase under a minimum balance constraint using conventional locking.

In business applications, blocking concurrent accesses to hot data or resources can severely impact performance, reducing the throughput and user experience, especially if the availability of the resource is enough to fulfill the concurrent requests. Referring to FIG. 1, it gives an example SQL code for making a $25 purchase if and only if making such a purchase would leave at least $50 in the user's account (Account 12345). The database table that stores the account information is "Account", which has fields for "ID Number" and "Balance". During the execution of the transaction, the "Balance" field of the row for ID=12345 is initially locked for update when the database server that is executing the transaction reaches the update statement (instruction 100). Then, the database server determines whether the purchase will violate the minimum balance constraint (instruction 102). If the constraint is not violated, then (instructions 104): (a) the purchase is executed, (b) $25 dollars is subtracted from the balance, and (c) the transaction commits. Otherwise, the purchase is not executed and the transaction rolls back (instruction 106).

As illustrated by this example, the transaction holds an exclusive lock that covers the row in question from before the constraint is checked until the transaction finally commits and/or rolls back. The duration of exclusive-lock-holding using this conventional technique may severely reduce database performance in some scenarios. For example, in the online sale of a large number of first-come-first-served concert tickets, there can be hundreds or thousands of transactions all competing to make updates to the same piece of hot data (e.g. the number of remaining available first-come-first-served seats). If all such transactions have to wait for their turn for an exclusive lock, and each one holds the lock for a significant amount of time, the performance of the system may be severely impacted.

Lock-Free Reservations

In many situations, updates to numerical values can be implemented with arithmetic operations (+/−), and these operations are commutative. For example, assume that 100 concert seats are available, and a user is ordering reservations for 5 seats. Rather than update the available seat value to "95", the transaction that makes the order can simply update the available seats to its current value minus 5.

For number manipulation, get/set can be replaced in almost all cases by +/−. Using the Lock-Free Reservation techniques described herein, multiple transactions can use such updates to numeric columns and update the same field concurrently (or in parallel). This added parallelism is bound to reduce response time and increase concurrency, especially for hot-spots, e.g., online shopping for hot articles.

There are countless variations of inventories—items in warehouse, (banking) accounts in any form, ticketing, etc. In any of these inventories, the number of items, the amount of cash, shares on hand etc. is by far the most frequently updated information.

Lock-Free Reservation improves concurrency for long running transactions by deferring row lock acquisition for updates on highly contended numerical values. At the time that transactions would conventionally acquire an exclusive lock on an object to perform an update, concurrent transactions instead acquire Lock-Free Reservation on the quantity being updated without locking the object. The actual object modification, and lock acquisition, are deferred to the time of transaction commit.

Lock-Free Reservation provides lesser isolation amongst transactions that operate on numeric and "aggregate data" without compromising on the semantic correctness. The term "aggregate data" refers to data that can be referenced as a single quantity, where the single quantity corresponds to multiple instances of the same type of item, for example: quantity-on-hand of products, bank account balances, stocks, number of seats available, etc.

With more and more inventory applications becoming prevalent, applications that involve transactions operating on numeric and aggregate data abound. Notably, Inventory control, Supply chain, Financial/Investment Banking, Billing and Payments, Stocks, Travel, Entertainment all operate on numeric aggregate data. The Lock-Free Reservation techniques described herein improve concurrency in such applications without compromising on the atomicity, consistency, or the durability properties of the transaction.

To provide concurrency benefits amongst transactions, Lock-Free Reservation requires the updates on the above mentioned numeric aggregate data to be of subtraction/addition (consume/replenish, or increment/decrement) of the quantity, rather than an assignment of the form "data←value" or blind writes.

Not all data are amenable to Lock-Free Reservation, and applications have a wide variety of data that they operate on. In mixed data applications, which is indeed the norm, applications will benefit from increased concurrency with transactions that perform Lock-Free Reservation. Lock-Free Reservation allows transactions to reserve an amount from a value without locking the data item that stores the value. The value is locked only when the reservations are transformed into actual modifications during the commit of the transaction. Thus, locks are held for a short duration on hot values, which increases concurrency.

Lock-Free Reservation provides a simple way by which the users/applications can indicate the attributes in their tables that would benefit from improved concurrency. In one implementation, a column property called Reservable is introduced so that users can indicate such numeric aggregate attributes in their tables. A reservable column allows multiple concurrent updates on the numeric column value to proceed without being blocked by uncommitted updates when adding or subtracting from the column value.

Lock-Free Reservation allows transactions to concurrently add or subtract from the same row's reservable column without blocking each other by specifying the conditions for which the updates may proceed. This is accomplished by specifying that the numeric column is a reservable column and creating a CHECK constraint for the column. Additional throughput improvement can also be achieved because the Lock-Free Reservation made to reservable columns do not lock the rows, and hence do not block another transaction from updating non-reservable columns of the same row concurrently.

FIG. 2 is a block diagram that illustrates execution, using Lock-Free Reservation, of the same transaction that is illustrated in FIG. 1. Referring to FIG. 2, the Data Definition Language (DDL) statement to create the Account table differs from that illustrated in FIG. 1 in that the Balance column is declared to have a "RESERVABLE CONSTRAINT" (instruction 202). It should be noted that the keywords "RESERVABLE CONSTRAINT" are merely one example of how to indicate to the database server that a column with a reservable column property along with a check constraint is to use Lock-Free Reservation, and the techniques described herein are not limited to any particular keywords. Further, a minimum balance constraint is merely one example of a type of constraint that may apply to a reservable column. The Lock-Free Reservation techniques described herein are not limited to any particular type of constraint.

In response to an indication that Lock-Free Reservation is to be used on a column with a reservable constraint, the database server creates a "reservation journal" that is associated with the reservable column in question. The reservation journal is used to keep track of the updates that:
- are to the column that is subject to the reservable column property,
- have been requested by transactions that have not yet committed, and
- have not yet been made to the underlying values in the reservable column.

In one implementation, reservation journals are implemented on a per-object (rather than per-column) basis. In such an implementation, a table with several reservable columns has a single reservation journal that has records of the reservations made to the various reservable columns.

As illustrated in FIG. 2, when a reservation journal exists, an update statement that targets a reservable column triggers a "reservation operation". The reservation operation does not immediately cause the transaction to obtain an exclusive lock. Instead, during a reservation operation, the database server:
- checks to see whether any constraints involving the reservable column will be violated by the update, and if no violation will occur, adds a record of the update request to the reservation journal.

The updates that are recorded in the reservation journal are "reserved", causing them to be "deferred" until the commit time of their respective transactions (instruction 204). Only at transaction commit is the exclusive lock on the underlying data obtained and the change to the underlying data made. The lock can then be immediately released. Further, because all applicable reservable constraints were checked at the time the reservation was made, it is guaranteed that the transaction will not fail at commit time due to violation of any reservable constraint. If two concurrent transactions try to make changes which, collectively, would violate a constraint, then the second transaction to attempt a reservation would be prevented due to the reservation of the first transaction. The database server may ensure that the second transaction does not make a reservation at the same time as the first transaction is making its reservation by, for example, obtaining a temporary lock that prevents concurrent reservations, on the same data item, to be made in the reservations table.

Lock-Free reservation may be used with a variety of types of transactions. For example, Lock-Free Reservation may be used with multi-step transactions, such as transactions that reserve/buy items for a single provider or multiple providers.

Lock-Free Reservations Example

Lock-Free Reservation shall now be discussed in the context of example where two constraints exist:
- a qty_on_hand (QOH) value cannot be less than zero, and
- the qty_on_hand (QOH) value cannot exceed the allotted shelf space.

An "Inventory" table that has these two constraints may be defined as follows:

```
CREATE TABLE inventory
( item_id         NUMBER        CONSTRAINT inv_pk PRIMARY KEY,
  item_display_name VARCHAR2(100) NOT NULL,
  item_desc       VARCHAR2(2000),
  qty_on_hand     NUMBER        RESERVABLE CONSTRAINT qty_ck CHECK
                    (qty_on_hand > 0),
  shelf_space_thres NUMBER      NOT NULL,
  CONSTRAINT shelf_ck CHECK(qty_on_hand <= shelf_space_thres)
);
```

This DDL statement causes a database server to create an inventory table with a reservable column qty_on_hand. The CHECK constraint qty_ck is a reservable constraint that specifies that there must be more than zero items in stock. The table level constraint shelf_ck is a non-reservable constraint that ensures that the reservable column, qty_on_hand, is at most the value in the shelf_space_thres column for the item. The shelf_ck constraint is non-reservable because the constraint references a non-reservable column "shelf_space_thres". Consequently, it is possible for the value of shelf_space_thres to change after a reservation is made by a transaction, but before the transaction commits. Consequently, it is not possible to know, at the time a reservation operation is performed, whether the non-reservable constraint will be violated when the update is actually performed at commit time.

Significantly, whether reservable constraints that involve a reservable column are satisfied is determined during the reservation operation for a transaction based on not only (a) the update being made by the transaction, and (b) the current value in the table, but also considering:

the cumulative effect of all outstanding reservations made by the transaction, and the cumulative effect of all of the outstanding reservations of the same type (increments for an incrementing update, decrements for a decrementing update) made by other uncommitted transactions.

Specifically, when a reservable column is updated, the reservation mechanism consults the reservation journal 350 of the object being modified for the pending reservations against the resource and the associated CHECK constraints involving the reservable column to determine if the reservation request can be fulfilled. As mentioned above, temporarily locks may be used to ensure that the reservation mechanism sees all relevant reservations in journal 350, including those made by any concurrently executing transactions.

By taking into account the cumulative effect of reserved updates, the Lock-Free Reservation mechanism honors pending reservations when new requests for reservations arrive by guaranteeing that no new reservation will be honored if its cumulative effect with all pre-existing reservations could result in a constraint violation. Although extra concurrency is achieved through non-isolation via the Lock-Free Reservation, the semantics of serializable and read committed executions are not compromised, as the protocol ensures that no commit order dependency is created among the transactions that have pending reservations against the same resource. The Lock-Free Reservation mechanism guarantees that for all reservations requests for which reservations are recorded, the actual update of the resource can be performed at any time in the future without violating reservable constraints, and in any order/outcome of the pending reservations against the resource.

If the constraints are satisfied, then the amount being added or subtracted is reserved (a record of the update is added to the reservation journal) and guaranteed through an internal reservation mechanism so that the transaction may proceed without waiting on other transactions that have made earlier reservations on the same row's reservable column to be committed.

Continuing with the example, assume that the current quantity on hand for an item_id=1234567 is 100. Assume further that Transactions 1, 2, and 3, which update the qty_on_hand value of the same inventory table row, run concurrently. The three transactions may then commit in any order.

```
Transaction 1:
UPDATE inventory
SET   qty_on_hand = qty_on_hand – 50
WHERE item_id = 1234567;
Transaction 2:
UPDATE inventory
SET   qty_on_hand = qty_on_hand – 30
WHERE item_id = 1234567;
Transaction 3:
UPDATE inventory
SET   qty_on_hand = qty_on_hand – 40
WHERE item_id = 1234567;
```

Figure 3:
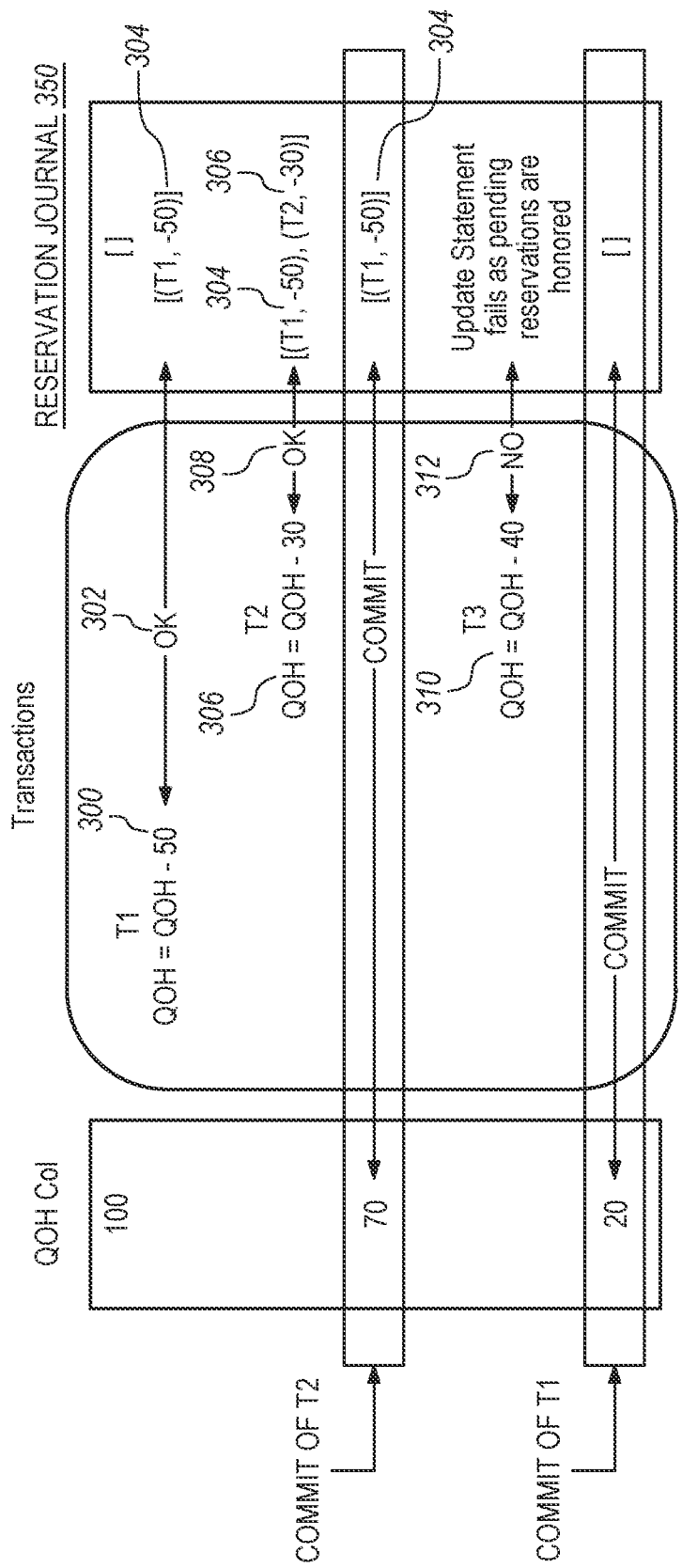
FIG. 3 is a block diagram of the sequence of operations, using a Lock-Free Reservation technique, when three concurrent transactions attempt to update the same data item.

FIG. 3 illustrates the scenario in which the transactions start in the order T1, T2, T3, and are ready to commit in the order T2, T3 T1. Referring to FIG. 3, the database server reaches the update statement (element 300) of T1 first. Upon reaching the T1 update statement "qty_on_hand=qty_on_hand −50", the database server performs a reservation operation. During the reservation operation, the database server determines whether the change made by the update statement of T1 would violate any applicable constraints. Specifically, the database server determined whether subtracting 50 from qty_on_hand, when combined with all other decrementing updates recorded in the reservation journal 350, would cause the qty_on_hand of the target row to fall below 0. The database server also determines whether the change, when combined with the other decrementing updates, would cause the qty_on_hand to exceed the shelf_space_thresh.

At this point, there are no updates recorded in the reservation journal 350, so the database server determines whether the current value of the QOH column (i.e. "100") minus "50" is less than zero. Since 100-50 is not less than zero, the reservable constraint is satisfied (indicated by the "OK" at (302)). The shelf_ck constraint is also satisfied, since no decrement update could cause qty_on_hand to exceed a threshold. Because all constraints are satisfied, a record 304 of the update is placed in the reservation journal 350. In the illustrated example, the record 304 of the update indicates the transaction that made the update (i.e. T1), and the effect of the update (i.e. −50).

After the record 304 is added to the reservation journal 350 for the update made by T1, the database server reaches the update statement (element 306) of T2, "qty_on_hand=qty_on_hand −30". The database server then performs another reservation operation. During this reservation operation, the database server determines whether the change made by the update statement of T2, when combined with all other updates recorded in the reservation journal 350, would violate any constraint. At this point, there is a record 304 of the update reserved by T1 in the reservation journal 350, so the database server determines whether the current value of the QOH column (i.e. 100) adjusted by the update of T1 (−50) combined with the update of T2 (−30) is less than zero. Since (100−50)−30 is not less than zero, the reservable constraint is satisfied (indicated by the "OK" (element 308)). The shelf_chk constraint is also satisfied. Because the applicable constraints are satisfied, a record 306 of the update is placed in the reservation journal 350. In the illustrated example, the record 306 of the T2 update specifies the transaction that made the update (i.e. T2), and the effect of the update (i.e. −30). At this point, the reservation journal 350 holds both records 304 and 306, as indicated by "[(T1, −50), (T2, −30)]".

After the record 306 is added to the reservation journal 350 for the update made by T2, the database server commits transaction T2. As explained above, at the commit time of a transaction, the database server obtains exclusive locks on the rows to which the transaction made reserved updates, and then performs those updates. Thus, to commit transaction T2, the database server:

obtains a lock on the row of the QOH column that corresponds to item_id=1234567 verifies that the non-reservable constraint shelf_chk is satisfied performs the update reserved by T2 (i.e. subtracts 30 from the QOH column of the target row, leaving 70)

removes the record for the update (record 306) from the reservation journal 350 commits T2, thereby releasing the lock on the target row

Thus, after the commit of T2, the current value in the QOH column becomes 70, and record 306 is removed from the reservation journal 350, leaving only record 304.

After the database server commits T2, the database server reaches the update statement (element 310) of T3, "qty_on_hand=qty_on_hand −40". The database server determines whether the change made by the update statement, when combined with all other decrement updates recorded in the reservation journal 350, would cause the qty_on_hand to fall below 0. At this point, there is a record of the decrement update of T1 in the reservation journal 350, so the database server determines whether the current value of the QOH column (i.e. 70) adjusted by the decrement update of T1 (i.e. minus "50") combined with the decrement update of T3 (−40) is less than zero. Since (70−50)−40 is less than zero, the reservable constraint is not satisfied (indicated by the "NO" at (312)). Because the reservable constraint is not satisfied, the update requested by T3 fails and no record is added to the reservation journal 350.

Various remedial actions that may be taken in response to such failures, based on the logic of the application associated with the transaction (i.e. T3). For example, the database server may simply roll back transaction T3, or try again to reserve the same amount (−40), or try again with a reduced amount (−30). The techniques described herein are not limited to any particular way of responding when a reservable constraint violation is detected at the time of a reservation operation.

After failure of the update requested by T3, the database server commits T1. To commit transaction T1, the database server:

obtains a lock on the row of the QOH column that corresponds to item_id=1234567 verifies that the non-reservable constraint shelf_chk is satisfied performs the update reserved by T1 (i.e. subtracts 50 from the QOH column of the target row, leaving 20)

removes the record for the update (record 304) from the reservation journal 350 commits T1, thereby releasing the lock on the target row

Thus, after the commit of T1, the current value in the QOH column becomes 20, and record 304 is removed from the reservation journal 350, leaving no records in the reservation journal 350.

Handling Transaction Rollbacks with Lock-Free Reservations

Figure 4:
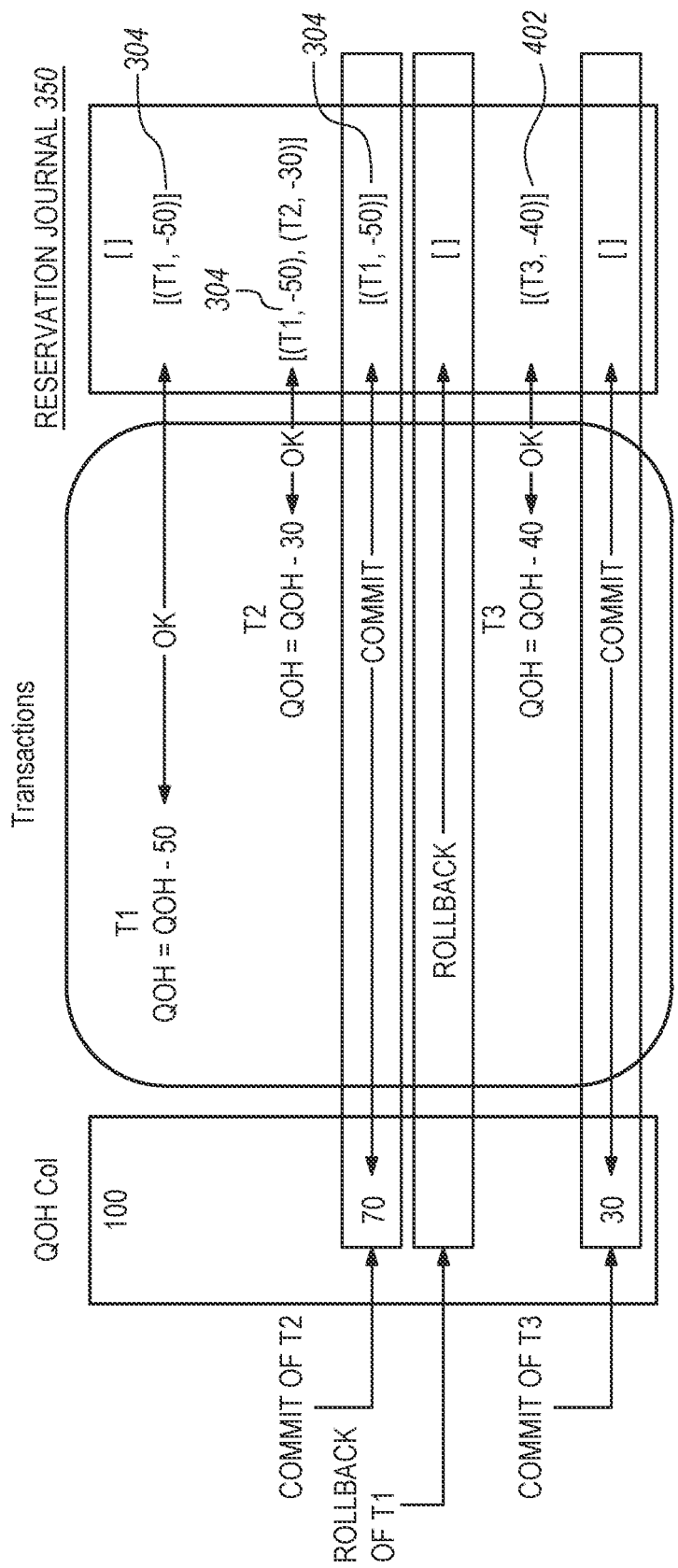
FIG. 4 is a block diagram of the sequence of operations, using a Lock-Free Reservation technique, when three concurrent transactions attempt to update the same data item and one of the transactions rolls back.

Referring to FIG. 4, it is a block diagram illustrating the same scenario as FIG. 3, with the exception that transaction T1 rolls back before the database server executes the update statement of transaction T3. Referring to FIG. 4, the database proceeds in the same manner as illustrated in FIG. 3 until transaction T1 rolls back. At the time that T1 rolls back, the record 304 made by T1 is removed from the reservation journal 350.

Because record 304 has been removed from the reservation journal 350, the update requested by transaction T3 is able to satisfy the reservable constraint ((70−40)>0). Thus, the update made by transaction T3 does not fail, but instead results in record 402 being added to the reservation journal 350.

To commit transaction T3, the database server:

obtains a lock on the row of the QOH column that corresponds to item_id=1234567 verifies that the non-reservable constraint shelf_chk is satisfied performs the update reserved by T3 (i.e. subtracts 40 from the QOH column of the target row, leaving 30)

removes the record for the update (record 402) from the reservation journal 350 commits T3, thereby releasing the lock on the target row

Thus, after the commit of T3, the current value in the QOH column becomes 30, and record 402 is removed from the reservation journal 350, leaving no records in the reservation journal 350.

Reserved Updates Triggered at Commit Time

As explained above, updates made by a transaction to a reserved column of a table are performed when the transaction commits. In one implementation, this is achieved by adding, during the reservation operation, a pre-commit callback to the transaction that performed the lock-free reservation. The pre-commit callback object tracks the reservable columns that were specified in the lock-free update.

Reserved Updates and Savepoints

In one implementation, the Lock-Free Reservation mechanism also supports rollback to savepoint. A savepoint number is also tracked along with the reservable column information in the pre-commit callback object. The savepoint number associated with a reservable column is used to delete the reservation records that were added to reservation journals after a particular savepoint was issued, to support rollback to savepoint. A rollback to savepoint not only updates the callback object, but also releases the reservations made on behalf of the reservable updates that are being rolled back. Specifically, assume that a transaction T4 makes five reservations before a savepoint, and four reservations after a savepoint. If transaction T4 rolls back to the savepoint, then the records for the four post-savepoint reservations are removed from their respective reservation journals, while the five pre-savepoint reservations remain unaffected.

Multiple Reservations to the Same Row by the Same Transaction

In one implementation, for each object against which reservable reservations are made by a transaction, the per row reservations are aggregated and applied in the primary key value order to avoid introducing deadlocks. For example, a transaction that requests 100 distinct updates to a value in a reservable column of a particular table will have the cumulative effect of those updates made in single update to the row, made at commit time. Thus, a transaction that makes the following reservations to qty_on_hand for a particular row: (−10), (−3), (−30), and (+10) would, at commit time, result in a single update of (−33) to the qty_on_hand value of that particular row. Aggregated reservations are thereby transformed into deferred updates, where locks are held on the resources for a very short duration during the commit time of the transaction.

If the same transaction has made updates to multiple reservable columns of the same row, then such aggregations are performed on a per-column basis before being applied, at commit time, using a single update statement. Thus, the cumulative update of five UPDATE commands for a transaction to the qty_on_hand value of a particular row may be (−33), while the cumulative update for six UPDATE commands by the same transaction to a second reservable column of the same table and row may be (+13). At commit time, a single update statement is executed to apply the respective cumulative changes to both columns of the particular row.

Check Constraints Involving both Reservable and Non-Reservable Columns

The same table level CHECK constraint may involve both reservable and non-reservable columns. For example, the inventory table discussed above has the following constraint: "shelf_ck CHECK(qty_on_hand <=shelf_space_thres)". This constraint involves both the reserved column "qty_on_hand" and the "shelf_space_thres" column, which is not reservable. Even if a particular update passes the shelf_ck constraint at the time the reservation operation is performed (e.g. because the shelf_space_thres is "500"), the update may nevertheless violate the shelf_ck constraint at the time of transaction commit if the value in the non-reservable column has changed (e.g. shelf_space_thres has been changed to "100").

Thus, because such CHECK constraints involve non-reservable columns, a pending reservation that did not violate such a constraint at the time that the lock-free update was issued may later violate the table level constraint at the commit time of the transaction. Consequently, the transaction will have to be aborted if, at commit time, application of the reservation causes the constraint to be violated. However, the non-reservable columns in a table level constraint are typically thresholds such as shelf space, the required balance in an account, spending limits etc., which are modified very infrequently. Thus, checking for violations of such constraints at commit time will rarely result in the need to rollback long-running transactions.

In the examples given above, constraints, such as "shelf_ck", involving both a reservable column and a non-reservable column are checked twice: once when the reservation operation is performed, and again at commit time. However, in alternative implementation, all checking of such constraints may be deferred until commit time. Deferring the checking of such constraints eliminates some work during the reservation operation. However, failing to check for such constraints during the reservation operation means that, in some cases, transactions will perform a significant amount of additional work before being rolled back due to a constraint violation that could have been detected earlier.

Same-Type Update Operations

When checking a constraint that involves a reservable column during a reservation operation, only "same-type" reservations are considered. Thus, for decrement/consumption updates, the constraint check is made based on the assumption that all existing decrement/consumption reservations will commit. Similarly, for increment/replenishment updates, the constraint check is made based on the assumption that all existing increment/replenishment reservations will commit. Only same-type reservations are considered because it is not known which prior reservations will actually commit, and performing constraint checks based on the assumption that other-type reservations will commit can lead to constraint violations.

Consequently, if there is not enough to fulfill a consume request without having to rely on any of the concurrent replenishments to succeed, the lock-free update (consume) statement fails. However, note that such failures are not common, as replenishment transactions are typically very short transactions that just add to the resource and commit and are not considered to be that frequent. A similar treatment described in this paragraph also applies to replenishment requests that cannot be fulfilled due to not enough shelf space or crossing the limits threshold etc.

Reservable Columns and Data Definition Language (DDL) Statements

According to one implementation, DDLs are handled as follows. Once a DDL on a table with one or more reservable columns has started, no new updates on the table are processed until the DDL completes. However, the DDL is not started if there are pending reservations for any rows of a user table. Instead, such a DDL is retried internally for a few times with a delay to allow for the transactions with pending reservations to finalize. If the pending reservation transactions finalize within the retry period, then the DDL is executed. If not, then the DDL encounters a resource busy error, and the user will have to try the DDL later.

Deleting an Item that has Pending Reservations

In the examples given above, transaction T1, T2 and T3 are performing updates to the qty_on_hand value of the same item (Item ID=12345). With Lock-Free Reservation, none of these transactions obtain a lock on the row at the time they make their reservation. Consequently, it is possible that a DML that deletes the target row (the row that corresponds to Item ID=12345) is received while there are still pending reservations that target the row. Since the transactions that have the reservations do not have locks on the row, the DML would normally not block (to wait for a lock).

However, to honor the reservations that have been recorded in the reservation journal, the database server handles this situation by (a) blocking new reservations on the row, (b) preventing the delete operation from executing (even though the row is not locked), and (c) retrying the delete operation after some specified amount of delay. The delete DML is retried until either (a) the transactions that have reservations on the row complete, or (b) a threshold number of retries have been attempted. If the transactions with reservations complete within the retry period, then the delete is performed. Otherwise, the delete may be aborted.

Designating Columns

As explained above, at the time a table is created, the columns of a table can be designated as Reservable to indicate that Lock-Free Reservation, and a reservation journal, are to be used when updates are made to the column. In addition, a column that would otherwise qualify for Lock-Free Reservation may be declared as non-reservable (or may be treated as non-reservable by default). For such a column, updates will be handled normally, requiring the acquisition of an exclusive lock at the time the update command is processed. In addition, the designation for a column may be changed after table creation using an appropriate ALTER table statement.

Application Transparency

The Lock-Free Reservation techniques described herein provide application transparency for applications that have updates to numeric columns with +/- operations. Specifically, in some implementations, no applications code changes are needed other than the schema changes of altering the appropriate numeric columns to have the Reservable column property.

Constraints Involving Reservable Columns

As illustrated in the examples given herein, reservable columns can be allowed to specify column level CHECK constraints that can be dropped and recreated to modify the bounds. In addition, reservable columns can also be part of table level constraints, thereby enabling constraints specific to a row. Examples include:

Rows tracking different inventory items can be regulated by their own shelf space threshold, and
Personal spending amounts can be different per customer etc.

Tables with Multiple Reservable Columns

Multiple columns of the same table can have the Reservable column property. In the examples given herein, the reservations for all reservable columns were stored in a single table-wide reservation journal. However, in alternative implementations, a table may have multiple reservation journals, such as one reservation journal per each reservable column.

Lock-Free Reservation supports aggregation and batching of reservations. If a transaction performs multiple row updates affecting multiple reservable columns, then during transaction commit the reservations made by the transaction are aggregated per row and applied in a single update statement per row. Specifically, as explained above, even when a table has multiple reservable columns, all updates made by a transaction to any reservable column of a particular row may be applied in a single UPDATE statement, at commit time, to that particular row.

Queries on Reservable Columns

For consistency, a query issued within the context of a transaction is able to see changes made by the transaction (even though it has not yet committed), but is unable to see changes made by other uncommitted transactions. Similarly, with Lock-Free Reservation, transactions can see their own reservations (and not the reservations made by the other uncommitted transactions) by querying the journal.

Responses to Failing to Satisfy a Constraint

When Lock-Free Reservation cannot be fulfilled (e.g. due to insufficient quantity), instead of immediately failing the updates, the database server may take any of the following remedial actions:

The user can specify (e.g. through DDL, a configuration parameter, or a query parameter) that a reservation can be fulfilled partially, as much as possible, with an optional minimum amount. In such cases the database server may respond immediately to the constraint failure by attempting to make a reservation with an amount that is different from the amount that caused the constraint failure. For example, the original request was to reserve 50. In response to a failure to satisfy the constraints, the same transaction can reduce the request to 40, etc.

The reservation mechanism can wait and retry the lock-free update statement internally in a loop with a delay between retries for a specified number of retries before giving up. In this case, the reservation may ultimately succeed (even though the reserved amount did not change between retries) because transactions with pre-existing reservations affecting the same row may have committed or rolled back.

Another option is to allow the user to specify that a lock-free update be placed on hold until the occurrence of an event. The event may be the lapse of a certain amount of time. As another example, the event may be a commit of a replenishing transaction or a roll back of a consuming transaction. When the specified event occurs, the database server checks the constraints again. If the constraints are satisfied (because the replenishing transaction committed or the consuming transaction was rolled back), then the lock-free update proceeds. If no such event occurs within some threshold time period (or the constraints are still not satisfied after the event), then the update may fail, or the database server may try one of the other remedial actions.

Automatic Expiration/Cancellation of Reservations

In the examples given above, a reservation remains in the reservation journal until the transaction making the reservation commits or rolls back. Unfortunately, this can lead to situations where a reservation of a long-running transaction prevents a large number of subsequently received reservation requests. If the long-running transaction ultimately fails, opportunities were lost because of the inability of the other transactions to make reservations. However, in one implementation, Lock-Free Reservation can automatically expire after a specified period. To facilitate the automatic expiration of reservations, the records in the reservation journal may include timestamps indicating when the reservations were made. In one implementation, expired reservations are immediately cancelled.

In other variation, rather than cancel an expired reservation unconditionally, the cancellation of expired reservations can be made "on-demand". In an "on-demand" implementation, expired reservations are only cancelled when some other transaction cannot proceed with its lock-free update unless an expired reservation is cancelled. For example, assume that (a) the qty_on_hand column has a ">0" constraint, the current value of qty_on_hand for item 12345 is 70 and transaction T1 has a reservation of −50 for the qty_on_hand value for item 12345. In an "on-demand" implementation, if the reservation expires, the reservation made by T1 is not immediately cancelled (removed from the reservation journal). Consequently, the expired reservation is still applied if T1 commits before the reservation is cancelled. However, if after the T1 reservation expires and before T1 commits, a later transaction T2 attempts a reservation of −40 for the qty_on_hand value of item 12345, then rather than fail the reservation request of T2, the expired reservation of T1 is cancelled, and the reservation request of T2 is allowed to proceed.

Prioritized Reservations

In the examples given above, all transactions are treated equally. However, in an alternative implementation, different transactions may be assigned different priorities. In a prioritized implementation, each reservation in the reservation journal may indicate the priority of the reservation (which may be the priority of the transaction making the reservation). In one implementation, constraints are checked in a prioritized transaction environment as illustrated in FIG. 6.

Figure 6:
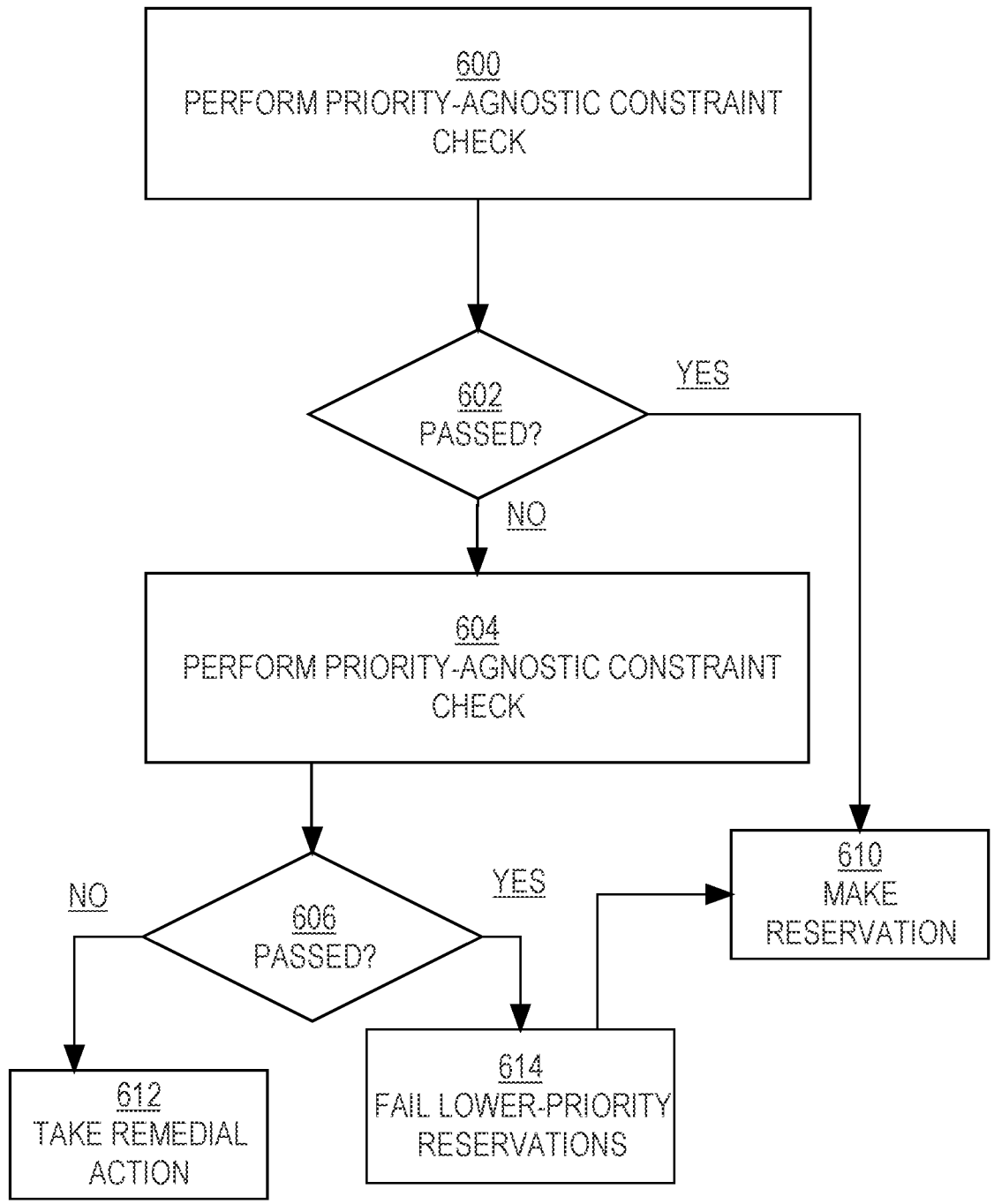
FIG. 6 is a flowchart of steps for determining whether a constraint is violated in a system that prioritizes transactions, according to one implementation.

Referring to FIG. 6, at step 600 the database server first makes a priority-agnostic constraint check based on:
 the current value of the reserved column
 the cumulative effect of all reservations made by the particular transaction
 the cumulative effect of all reservations, of the same type, made by other uncommitted transactions If the priority-agnostic constraint check succeeds (step 602), then the reservation is added to the reservation journal (step 610) without failing any existing reservation. If the priority-agnostic constraint check fails, then the database server performs a priority-sensitive constraint check (step 604) based on:
 the current value of the reserved column
 the cumulative effect of all reservations made by the particular transaction
 the cumulative effect of all reservations, of the same type, made by other uncommitted transactions that have the same priority or higher priority than the particular transaction If priority-sensitive constraint check succeeds (at step 606), then the higher-priority's reservation is made to succeed (step 610) by failing one or more lower priority transactions' already-recorded reservation(s) (step 614).

Reservations Using Percentage-Based Updates

In the examples given above, the updates that make use of Lock-Free Reservation are updates in which a value in a reservable column is incremented or decremented. However, Lock-Free Reservation may also be used in other situations.

For example, Lock-Free Reservation may be used for percentage and other arithmetic operations by transforming the arithmetic expression into an amount to be added or subtracted from the current value to be reserved.

For example, when 20% of the available inventory of 150 items needs to be moved to another warehouse location, the qty_on_hand reserved will be converted from "20%*qty-on-hand" to "qty_on_hand=qty_on_hand −30". The conversion takes place at the time the reservation is made (and constraints are checked), rather than at commit. Once such requests are converted to their increment/decrement equivalents, the lock-free reservation mechanism works the same way as described above with respect to increment/decrement updates.

Tracking Reservation Failures

The inability to make a reservation due to constraint failure often signals that demand for an item exceeds the current supply. Consequently, in some implementations, the database server may track reservation failures, and the amounts that were requested therein. This information about how much demand for an item exceeded the supply can be used to drive a notification/alert mechanism for backfilling orders proactively.

Lock-Free Reservations with Hierarchical and Graph Structures

While Lock-Free Reservation has been described herein with reference to a shopping cart scenario in which items are being purchased, the techniques may be applied in any context in which items are subject to increment/decrement operations. For example, the techniques may be applied to reduce contention making updates for a hierarchical or graph structure represented in the database.

In such a scenario, edges and/or vertices of the structure may be weighted, and multiple concurrent transactions may contend for locks to make adjustments to the weights of the edges/vertices. To reduce contention, the updates may be made using the Lock-Free Reservation mechanism described herein, where the changes made by the updates are initially "reserved", and obtaining locks is deferred until transaction commit.

Using Lock-Free Reservations with Sagas

As explained above, a saga is a sequence of transactions that are to be performed as an atomic unit. Techniques are described herein for achieving automated compensation for sagas by employing the database-native Lock-Free Reservation framework that simplifies the compensation logic. As explained above, the Lock-Free Reservation framework introduces a new column property called "reservable" for a column with a numeric data type. A reservable column allows multiple concurrent updates to proceed without being blocked by uncommitted updates when adding or subtracting from the column value. Updates to reservable columns are journaled and these reservations are used to derive the compensating operations to be performed when a saga aborts. The Lock-Free Reservation feature guarantees that the reservable column updates performed within a transaction can be compensated. This is ensured by modeling the lock-free updates to reservable columns as delta changes to the original numeric value by using commutative operations such as addition and subtraction whose inverse operations also commute. Specifically, commutativity, associativity, and the existence of exactly one inverse element of the numbers ensures that Lock-Free Reservations work regardless of which group of concurrent transactions ultimately succeed or fail.

In the context of sagas, the database-native Lock-Free Reservation infrastructure can provide automatic compensation for the reservable column updates made by successful local transactions (or microservice actions) that are part of a saga that is being aborted. As explained in greater detail hereafter, the automatic compensation is achieved by tracking the reservable column updates within the database during the execution of the local transaction and remembering them beyond the commit of the local transaction until the finalization of the saga that the transaction is a part of.

A "saga coordinator" is used to keep track of the status of all local transactions of a saga. If the saga aborts, all changes made by the saga's local transactions must be either rolled back (for active local transactions) or compensated (for committed local transactions). How the database server uses the reservations in the reservations journal to perform such compensation shall be described hereafter in greater detail.

The auto-compensation techniques described herein are integrated into a database management system (DBMS), providing low latency seamless transaction and lock management. In addition, updates to reservable columns do not acquire any row locks until the commit time of the local transaction (which is part of a saga transaction). This avoids holding a lock for the entire duration of the local transaction that is part of the saga. Additionally, the Lock-Free Reservation feature allows both saga and non-saga transactions to hold lock-free reservation on the same reservable column (and data item within the column) at the same time. Thus, in comparison, Lock-Free Reservation provides database-native automatic compensation for sagas and provides higher concurrency, thereby delivering a significantly better user experience not only for sagas but also for local transactions, especially when the transactions are long running.

Retaining Reservations Journal Records after Commit

For a transaction that is not part of a saga, the reservations made by the transaction are removed from the reservations journal at the time the transaction is committed. However, when the transaction that made the reservation is a local transaction of a saga, the reservations made the transaction are not removed at commit time of the local transaction. Instead, the reservations are retained in hold state with the inverse operation. These reservations are held till the saga transaction finalizes. Retaining the reservations of a local transaction in the hold state in the reservations journal facilitates and ensures the automatic compensation of the local transaction (that belongs to the saga) if the saga needs to be aborted later.

Specifically, when a local transaction of a saga is involved, the Reservation Journal, in addition to tracking the reservation amounts of the reservable column updates, also tracks:

the status of the local transaction, and
the associated Saga ID

The journal entries are persisted and made visible to database servers that have access to the database in which the reservation journal resides. The reservations of a saga are retained even after the local transaction that made the reservation has committed, and are not purged until the saga is finalized.

When a saga commits, the reservations journal entries made by local transactions associated with the saga are deleted from the reservations journal. On the other hand, if the saga is aborted, then the information tracked in the journal is used to automatically generate compensating actions for the transaction to be compensated. The compensating transaction is internally performed by the server on the affected reservable columns of the user tables operated by the saga, and the corresponding reservation journal entries are deleted.

In addition to the automatic compensation provided for reservable column updates, user-defined compensations functions can be provided by the user as callback functions for compensating the changes made to non-reservable columns.

Example of Lock-Free Reservations with Local Transactions

Figure 8:
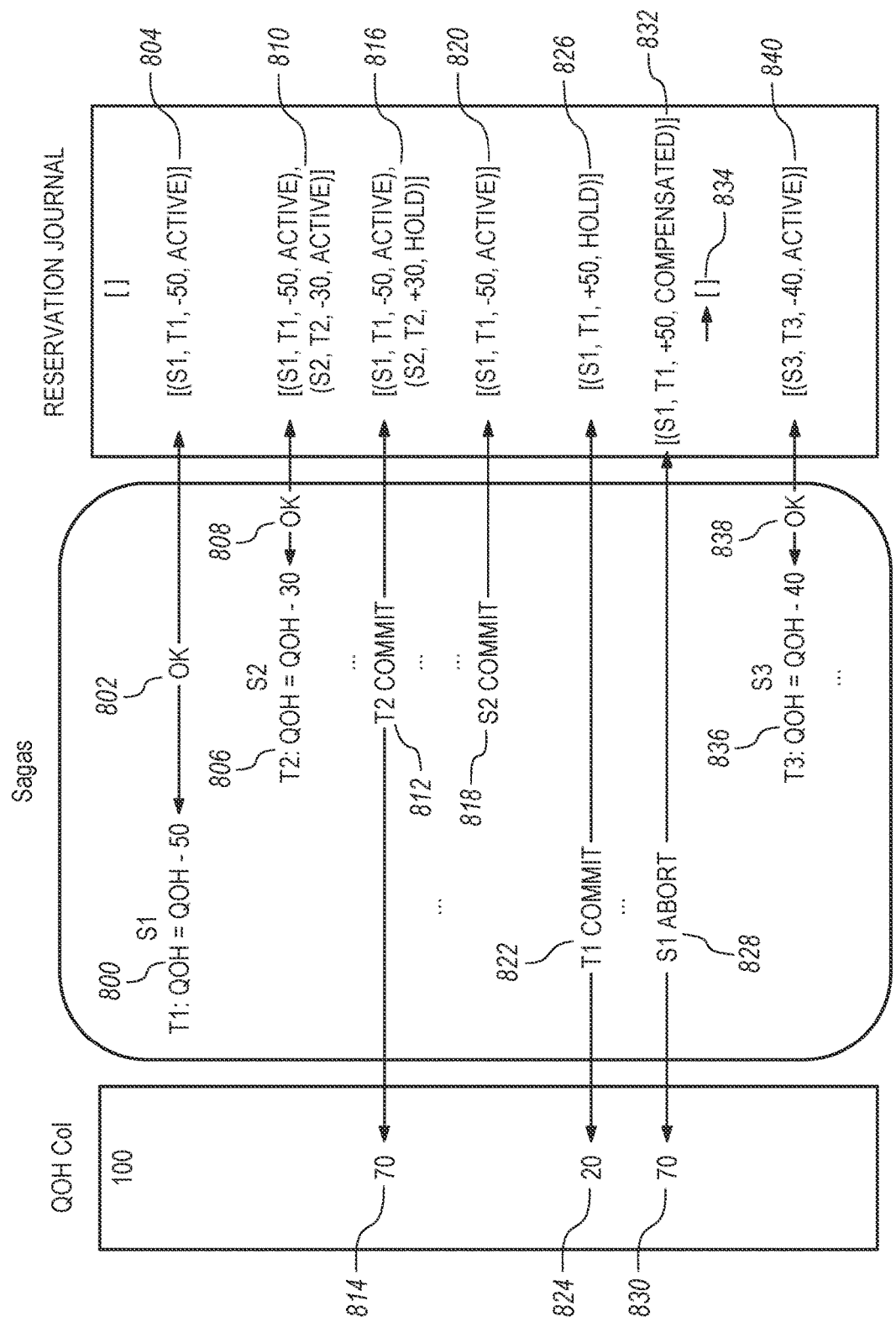
FIG. 8 is a block diagram that illustrates how lock-free reservation may be used with the local transactions of saga to facilitate database-native auto-compensation in case of saga aborts.

As explained above, lock-free reservation may be used by local transactions in the same way they are used with transactions that are not part of sagas, except that:
- the records for the reservations of local transactions include an identifier of the saga to which the local transactions belong
- the records for the reservations of local transactions include an indication of the status of the local transactions
- the records for the reservations of local transactions are removed from the reservations journal when the saga terminates, not when the local transactions commit Referring to FIG. 8, it is a block diagram that illustrates the sequence of actions when local transactions for three sagas (S1, S2, and S3) perform updates to the value of the qty_on_hand column of a particular row. Initially, the qty_on_hand value of the particular row is 100. Then, at 800, transaction T1, which is a local transaction of saga S1, requests an update (−50) to the target data item.

Rather than obtain a lock that covers the target item, the database server determines whether the relevant constraints would be violated. As mentioned above, such a determination takes into account all relevant reservations in the reservations journal. In the case of local transactions that belong to sagas, their reservations are considered "relevant" to constraint determinations if the status of the local transaction is active or hold.

At this point, reservations journal does not contain any reservations, and the current value of the target data item is 100. Consequently, the −50 update would not violate any constraints, as indicated by the "OK" (element 802).

Because the update, when combined with existing active reservations, would not cause any constraints to be violated, a record of the reservation is added to reservations journal at 804. The reservation includes the identifier of the saga (S1), the identifier of the local transaction (T1), the amount of the update (−50), and an indication of the status of transaction T1 ("active").

Then, at 806, transaction T2, which is a local transaction of saga S2, requests an update (−30) to the same target data item. Rather than obtain a lock that covers the target item, the database server determines whether the relevant constraints would be violated. As mentioned above, such a determination takes into account all relevant reservations in the reservations journal. At this point, reservations journal contains the reservation made by T1 (−50), and the current value of the target data item is 100. Since (100−50)−30 is greater than zero, the −30 update would not violate any constraints, as indicated by the "OK" (element 808).

Because the update, when combined with existing active reservations, would not cause any constraints to be violated, a record (element 810) of the reservation is added to reservations journal. The reservation includes the identifier of the saga (S2), the identifier of the local transaction (T2), the amount of the update (−30), and an indication of the status of transaction T2 ("active").

At this point, transaction T2 commits (812). At the time transaction T2 commits, the database server obtains a lock on the target item and applies the updates that were reserved by T2 (814). As explained above, if the same data item was updated multiple times by T2, the updates may be cumulated and applied in a single update operation. After the updates are performed, the database server commits T2 and releases the locks.

Because T2 is a local transaction that is part of a saga S2 that has not completed, the records of the reservations made by transaction T2 are not removed from the reservations journal. Instead, the transaction status indicator of the records is changed from "active" to "hold" and the operation is changed to its inverse (from −30 to +30), as illustrated at 816.

In the example illustrated in FIG. 8, the saga S2 commits at this point (818). When saga S2 commits, the saga coordinator for saga S2 informs all of the participants in S2 that saga S2 has committed. The database server that executed T2 was one such participant. In response to being informed that saga S2 is committing, the database server deletes the records of all reservations made by the local transactions of saga S2. Consequently, at 820, the record (S2, T2, +30, HOLD) has been removed from the reservations journal, leaving only the record (S1, T1, −50, ACTIVE).

At 822, transaction T1 commits. At the time transaction T1 commits, the database server obtains a lock on the target item and applies the updates that were reserved by T1 (824). After the updates are performed, the database server commits T1 and releases the locks.

Because T1 is a local transaction that is part of a saga S1 that has not completed, the records of the reservations made by transaction T1 are not removed from the reservations journal. Instead, the transaction status indicator of the record is changed from "active" to "hold" and the operation is changed to its inverse, as illustrated at 826.

At 828, saga S1 aborts. When saga S1 aborts, the saga coordinator for saga S1 informs all participants in saga S1 that saga S1 is aborting. In response to being informed that sage S1 is aborting, the database server must compensate for the changes made by transaction T1. To do so, the database server locates the record (S1, T1, +50, HOLD) and compensates for the change made by the update by:
- obtaining a lock on the data item,
- adding 50 to the value, and
- releasing the lock.

As a result, the stored value of the data item becomes 70, as illustrated at 830. In addition, the status of the reservation made by transaction T1 is changed from "HOLD" to "COMPENSATED" (832).

When the compensation for all changes made by T1 to values in reservable columns has been performed, the database server then removes the reservation records, as illustrated at 834. In addition to removing the reservations made for local transactions of a saga from the reservations journal in response to termination of a saga (either commit or abort), the reservations (or some of the information contained therein) may be moved to elsewhere, such as audit tables, to keep a history of database activity. Alternatively, the database server may leave the reservations made by the local transactions of sagas in the reservations table after the sagas terminate.

At 836, a transaction T3, which is a local transaction of a saga S3, requests an update (−40) to the target data item. At this point, reservations journal does not contain any reservations, and the current value of the target data item is 70 (because the update made by T1 has been compensated). Consequently, the −40 update would not violate any constraints, as indicated by the "OK" (element 838).

Because the update, when combined with existing active reservations, would not cause any constraints to be violated, a record of the reservation is added to reservations journal at 840. The reservation includes the identifier of the saga (S3), the identifier of the local transaction (T3), the amount of the update (−40), and an indication of the status of transaction T3 ("active").

Interaction of Sagas and Transactions that are not Part of Sagas

In the examples illustrated in FIGS. 3 and 4, all reservations were made by transactions that are not part of sagas. In the example illustrated in FIG. 8, all reservations are made by transactions that belong to sagas. However, lock-free reservation may be made on the same data item by both transactions that are not part of sagas, and by local transactions that are part of sagas. Specifically, the techniques described herein may be used with multiple non-saga transactions, sagas/workflows, and any mixture thereof.

In such scenarios, the reservations are treated respectively as described above. Specifically, reservations that are made by transactions that are not part of sagas are removed at transaction commit, while reservations made by local transactions of sagas are retained (but have the status and inverse operation changed).

When checking a constraint that involves a reservable column during a reservation operation, only "same-type" reservations are considered. Thus, for decrement/consumption updates, the constraint check is made based on the assumption that all existing decrement/consumption reservations will commit. Similarly, for increment/replenishment updates, the constraint check is made based on the assumption that all existing increment/replenishment reservations will commit. Only same-type reservations are considered because it is not known which prior reservations will actually commit, and performing constraint checks based on the assumption that other-type reservations will commit can lead to constraint violations.

Consequently, if there is not enough to fulfill a consume request without having to rely on any of the concurrent replenishments to succeed, the lock-free update statement is failed. However, such failures are not common, as replenishment transactions are typically very short transactions that just add to the resource and commit and are not considered to be that frequent. A similar treatment described in this paragraph also applies to replenishment requests that cannot be fulfilled due to not enough shelf space or crossing the limits threshold etc.

In the case where the same reservations journal stores reservations for both transactions that are part of sagas and transactions that are not part of sagas, the reservations for transactions that are not part of sagas may have a "null" where the saga indicator would otherwise be stored.

User-Defined Compensation Mechanisms

In the examples given above, the retained reservation journal entries are used by the database server to perform automatic compensation for local transactions of a saga that aborts. This compensation is performed automatically by the database server in response to the abort of a saga. However, the local transactions of a saga may also have made committed changes to values in columns that are not reservable. In such cases, the updates would have been made in the conventional manner, without use of lock-free reservation or a reservations journal. In such cases, the user may need to provide user-defined compensation mechanisms to compensate for committed changes to values in columns that are not reservable.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of the entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the user defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data type and to be processed by a DBMS in database statements. In general, database software of a DBMS is programmed to recognize and process native data types without configuring the DBMS to do so, by for example, defining a data type by issuing DDL statements to the DBMS.

Saga-Exclusive Locking

In the examples given above, the database server uses lock-free reservation to defer, until commit time, the need to obtain locks for updates made by the local transactions of sagas. In an alternative embodiment, locks may be obtained by such local transactions in a convention manner, but only enforced against other local transactions that belong to the same saga.

For example, assume that saga S1 involves three local transactions T1, T2 and T3. When transaction T1 performs an update on a particular data item (e.g. the qty_on_hand value of a particular row), the transaction T1 obtains a "saga-exclusive" lock that covers that particular data item. Consequently, any transaction that subsequently attempts to obtain a lock on the same data item will be blocked, unless the transaction belongs to saga S1. That is, any transaction that is part of a different saga, or is not part of any saga, will be blocked if the transaction attempts to update the same data item. However, transaction T2 and T3 are not blocked by the saga-exclusive lock held by transaction T1 because they belong to the same saga (S1) as transaction T1. Instead, transaction T2 and T3 may themselves obtain saga-exclusive locks, and perform updates on the same data item without blocking.

The use of saga-exclusive locks in this manner does not create the same consistency problems that would otherwise occur between unrelated transactions, since the system guarantees that all changes made by the local transactions of any given saga will all commit, or all be undone, based on whether the saga itself completes successfully.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
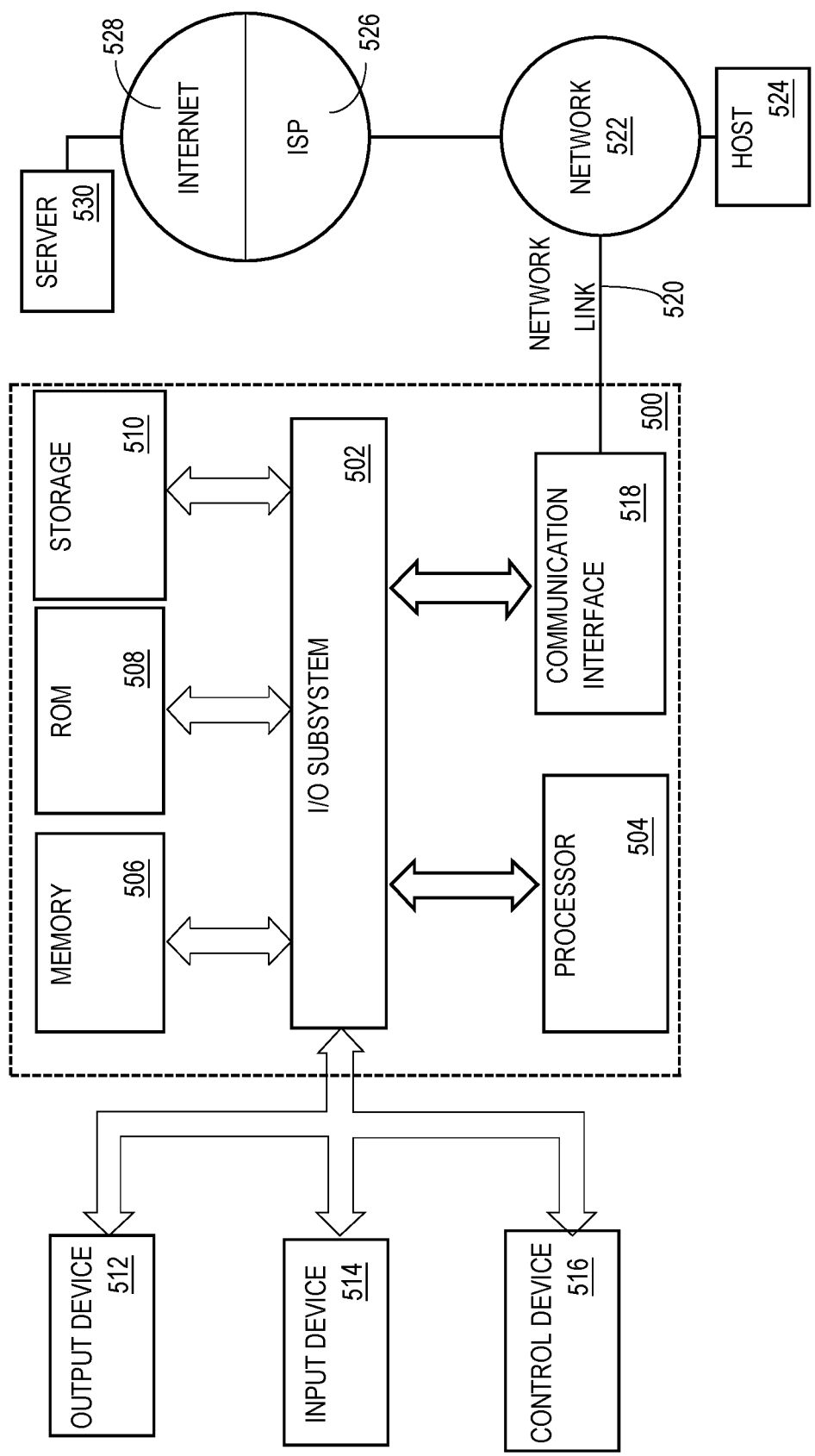
FIG. 5 is a block diagram of a computer system that may be used to implement the Lock-Free Reservation techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 7:
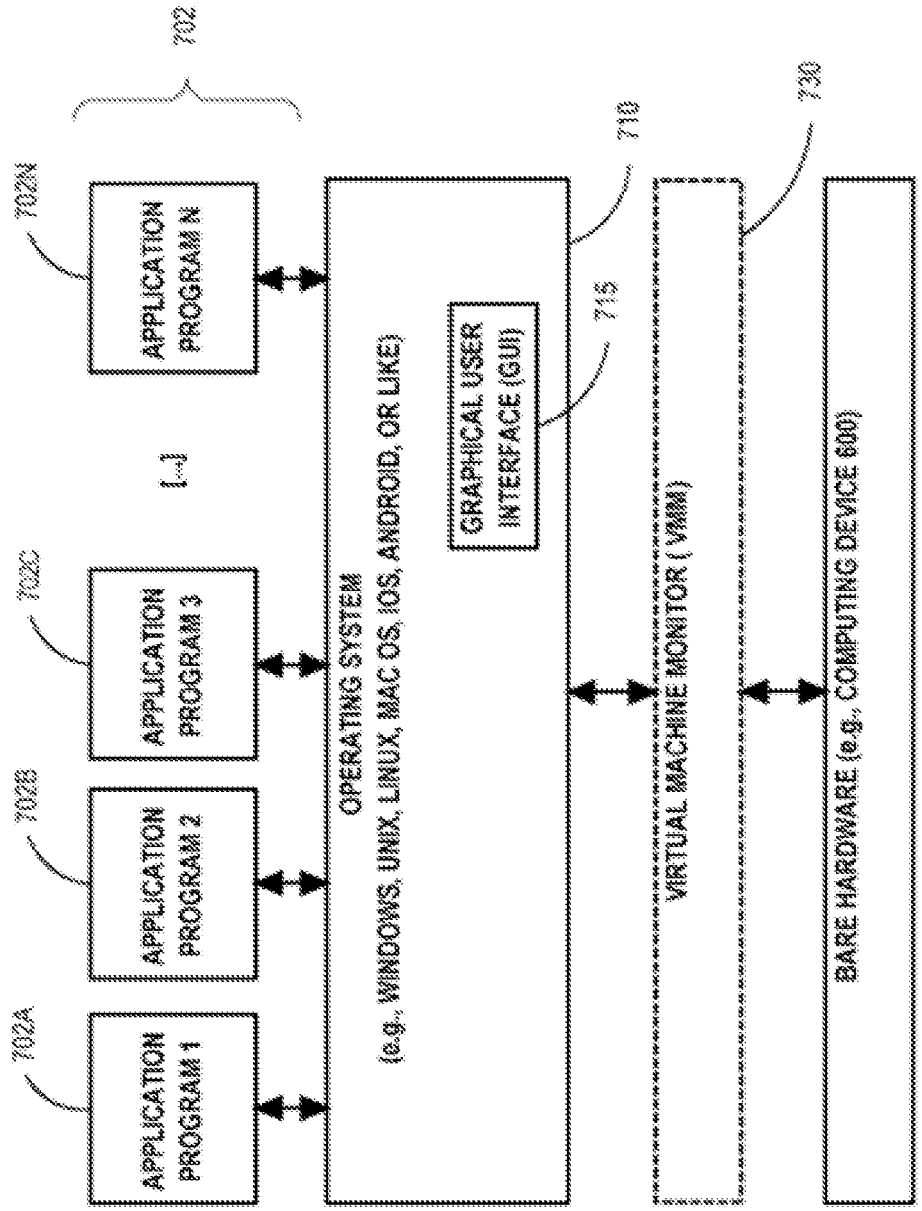
FIG. 7 is a block diagram of a basic software system that may be employed for controlling the operation of a computing system.

The following FIG. 7 is a block diagram of a basic software system 700 that may be employed for controlling the operation of computing system 500.

Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 500. Software system 700, which may be stored in system memory (RAM) 506 and on fixed storage (e.g., hard disk or flash memory) 510, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 510 into memory 506) for execution by the system 700. The applications or other software intended for use on computer system 500 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 504) of computer system 500. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 500.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 500 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
specifying a numeric column of a particular table to be a reservable column and creating one or more constraints involving the reservable column;
while executing a particular transaction, a database server processing an update to a particular row of the reservable column of the particular table by:
determining whether the one or more constraints involving the reservable column would be violated if the update were performed;
responsive to determining that the one or more constraints involving the reservable column would not be violated if the update were performed, without obtaining a lock that covers the particular row, adding a reservation to a reservation journal;
wherein the reservation is a record that:
identifies the particular transaction; and
specifies an amount by which to increment or decrement a value in the reservable column of the particular row;
at a commit time of the particular transaction, the database server performing:
obtaining a lock that covers the particular row;
incrementing or decrementing the value in the reservable column of the particular row by the amount; and
committing the particular transaction;
wherein the method is performed by one or more computing devices.

2. The method of claim 1 wherein:
the one or more constraints include a particular constraint that involves the reservable column and one or more non-reservable columns;
the method further comprises at the commit time of the particular transaction, determining whether the particular constraint would be violated if the update were performed, and
the step of incrementing or decrementing the value in the reservable column of the particular row is performed responsive to determining, at the commit time, that the particular constraint would not be violated if the update were performed.

3. The method of claim 1 wherein determining whether one or more constraints involving the reservable column would be violated if the update were performed includes determining whether the one or more constraints involving the reservable column would be violated if:
  (a) all same-type operations recorded in the reservation journal by other uncommitted transactions were made, and
  (b) all updates requested by the particular transaction were made.

4. The method of claim 1 wherein:
the particular transaction has a particular priority; and
determining whether one or more constraints involving the reservable column would be violated if the update were performed includes determining whether the one or more constraints involving the reservable column would be violated if:
  (a) all same-type operations recorded in the reservation journal by other uncommitted transactions that are of equal or greater priority to the particular priority were made, and
  (b) all updates requested by the particular transaction were made.

5. The method of claim 4 further comprising:
making a determination that a second transaction, that has a priority less than the particular priority, has a pre-existing reservation that, when combined with the update, causes violation of at least one constraint; and
responsive to making the determination, causing the pre-existing reservation to fail.

6. The method of claim 1 further comprising:
while executing a second transaction, the database server processing a second update to the particular row of the reservable column by:
without obtaining a lock that covers the particular row, adding a second reservation to the reservation journal;
wherein the second reservation is a second record that:
  identifies the second transaction; and
  specifies a second amount by which to increment or decrement the value in the reservable column of the particular row;
prior to a commit time of the second transaction, the database server rolling back at least a portion of the second transaction, wherein the portion includes the second update;
in response to rolling back the portion of the second transaction, removing from the reservation journal the second reservation.

7. The method of claim 6 wherein rolling back at least a portion is performed by rolling back to a particular savepoint.

8. The method of claim 1 wherein:
the particular transaction requests a plurality of updates to the reservable column of the particular row; and
incrementing or decrementing the value in the reservable column of the particular row is performed by executing a single update operation that increments or decrements the value based on a cumulative effect of the plurality of updates.

9. The method of claim 8 wherein:
the reservable column is a first reservable column of the particular table;
the particular table has a second reservable column;
the particular transaction requests a second plurality of updates to a value in the second reservable column of the particular row; and
the single update operation also increments or decrements the value in the second reservable column of the particular row based on a cumulative effect of the second plurality of updates.

10. The method of claim 1 further comprising:
while the reservation journal has one or more pending reservations for the reservable column, receiving a Data Definition Language (DDL) command that targets the particular table;
responsive to determining that the reservation journal has one or more pending reservations for the reservable column, retrying the DDL command until either (a) the reservable column has no remaining pending reservations, or (b) a retry termination condition is satisfied.

11. The method of claim 1 further comprising:
while the reservation journal has one or more reservations involving the particular row, receiving a delete command, from a second transaction, to delete the particular row; and responsive to determining that the reservation journal has one or more reservations involving the particular row, retrying the delete command until either (a) the reservable column has no remaining pending reservations involving the particular row, or (b) a retry termination condition is satisfied.

12. The method of claim 1 further comprising:
while executing a second transaction, the database server processing a second update to the value in the particular row of the reservable column by:
determining whether one or more constraints involving the reservable column would be violated if the second update were performed; and
responsive to determining that one or more constraints involving the reservable column would be violated if the second update were performed, performing a remedial operation selected from the group consisting of:
  attempting a reservation, for the value in the particular row, of a different amount than an amount specified for the second update,
  retrying the second update after waiting a retry duration, or
  placing the second update on hold until occurrence of a particular event.

13. The method of claim 1 wherein:
the reservation journal has a pre-existing reservation for an update to the value in the particular row of the reservable column; and
the method further comprises causing the pre-existing reservation to automatically expire after lapse of a predetermined period of time.

14. The method of claim 13 further comprising, responsive to expiration of the pre-existing reservation, immediately cancelling the pre-existing reservation.

15. The method of claim 13 further comprising, after expiration of the pre-existing reservation, cancelling the pre-existing reservation in response to a later-received reservation request if the pre-existing reservation would cause failure of the later-received reservation request.

16. The method of claim 1 wherein:
the update is a percentage-based update that specifies a percentage; and
the amount by which to increment or decrement the value is determined by the database server based, at least in part, on the percentage.

17. One or more non-transitory computer-readable media storing instructions which, when executed by one or more computing devices, cause:

specifying a numeric column of a particular table to be a reservable column and creating one or more constraints involving the reservable column;

while executing a particular transaction, a database server processing an update to a particular row of the reservable column of the particular table by:

determining whether the one or more constraints involving the reservable column would be violated if the update were performed;

responsive to determining that the one or more constraints involving the reservable column would not be violated if the update were performed, without obtaining a lock that covers the particular row, adding a reservation to a reservation journal;

wherein the reservation is a record that:

identifies the particular transaction; and specifies an amount by which to increment or decrement a value in the reservable column of the particular row;

at a commit time of the particular transaction, the database server performing:

obtaining a lock that covers the particular row;

incrementing or decrementing the value in the reservable column of the particular row by the amount; and committing the particular transaction.

18. The one or more non-transitory computer-readable media of claim 17 wherein:

the one or more constraints include a particular constraint that involves the reservable column and one or more non-reservable columns;

the instructions further comprise instructions for:

at the commit time of the particular transaction, determining whether the particular constraint would be violated if the update were performed, and incrementing or decrementing the value in the reservable column of the particular row only if the particular constraint would not be violated if the update were performed.

19. The one or more non-transitory computer-readable media of claim 17 wherein determining whether one or more constraints involving the reservable column would be violated if the update were performed includes determining whether the one or more constraints involving the reservable column would be violated if:

(a) all same-type operations recorded in the reservation journal by other uncommitted transactions were made, and (b) all updates requested by the particular transaction were made.

20. The one or more non-transitory computer-readable media of claim 17 wherein:

the reservation journal has a pre-existing reservation for an update to the value in the particular row of the reservable column; and the instructions include instructions for causing the pre-existing reservation to automatically expire after lapse of a predetermined period of time.

21. The one or more non-transitory computer-readable media of claim 17 wherein:

the particular transaction has a particular priority; and determining whether one or more constraints involving the reservable column would be violated if the update were performed includes determining whether the one or more constraints involving the reservable column would be violated if:

(a) all same-type operations recorded in the reservation journal by other uncommitted transactions that are of equal or greater priority to the particular priority were made, and (b) all updates requested by the particular transaction were made.

22. The one or more non-transitory computer-readable media of claim 21, wherein the instructions, when executed by one or more computing devices, further cause:

making a determination that a second transaction, that has a priority less than the particular priority, has a pre-existing reservation that, when combined with the update, causes violation of at least one constraint; and responsive to making the determination, causing the pre-existing reservation to fail.

23. The one or more non-transitory computer-readable media of claim 17, wherein the instructions, when executed by one or more computing devices, further cause:

while executing a second transaction, the database server processing a second update to the particular row of the reservable column by:

without obtaining a lock that covers the particular row, adding a second reservation to the reservation journal;

wherein the second reservation is a second record that:

identifies the second transaction; and specifies a second amount by which to increment or decrement the value in the reservable column of the particular row;

prior to a commit time of the second transaction, the database server rolling back at least a portion of the second transaction, wherein the portion includes the second update;

in response to rolling back the portion of the second transaction, removing from the reservation journal the second reservation.

24. The one or more non-transitory computer-readable media of claim 23, wherein rolling back at least a portion is performed by rolling back to a particular savepoint.

25. The one or more non-transitory computer-readable media of claim 17, wherein:

the particular transaction requests a plurality of updates to the reservable column of the particular row; and incrementing or decrementing the value in the reservable column of the particular row is performed by executing a single update operation that increments or decrements the value based on a cumulative effect of the plurality of updates.

26. The one or more non-transitory computer-readable media of claim 25, wherein:

the reservable column is a first reservable column of the particular table;

the particular table has a second reservable column;

the particular transaction requests a second plurality of updates to a value in the second reservable column of the particular row; and the single update operation also increments or decrements the value in the second reservable column of the particular row based on a cumulative effect of the second plurality of updates.

27. The one or more non-transitory computer-readable media of claim 17, wherein the instructions, when executed by one or more computing devices, further cause:

while the reservation journal has one or more pending reservations for the reservable column, receiving a Data Definition Language (DDL) command that targets the particular table;

responsive to determining that the reservation journal has one or more pending reservations for the reservable column, retrying the DDL command until either (a) the reservable column has no remaining pending reservations, or (b) a retry termination condition is satisfied.

28. The one or more non-transitory computer-readable media of claim 17, wherein the instructions, when executed by one or more computing devices, further cause:

while the reservation journal has one or more reservations involving the particular row, receiving a delete command, from a second transaction, to delete the particular row; and responsive to determining that the reservation journal has one or more reservations involving the particular row, retrying the delete command until either (a) the reservable column has no remaining pending reservations involving the particular row, or (b) a retry termination condition is satisfied.

29. The one or more non-transitory computer-readable media of claim 17, wherein the instructions, when executed by one or more computing devices, further cause:

while executing a second transaction, the database server processing a second update to the value in the particular row of the reservable column by:

determining whether one or more constraints involving the reservable column would be violated if the second update were performed; and responsive to determining that one or more constraints involving the reservable column would be violated if the second update were performed, performing a remedial operation selected from the group consisting of:
attempting a reservation, for the value in the particular row, of a different amount than an amount specified for the second update, retrying the second update after waiting a retry duration, or placing the second update on hold until occurrence of a particular event.

30. The one or more non-transitory computer-readable media of claim 17, wherein:

the reservation journal has a pre-existing reservation for an update to the value in the particular row of the reservable column; and the instructions further cause the pre-existing reservation to automatically expire after lapse of a predetermined period of time.

31. The one or more non-transitory computer-readable media of claim 30, wherein the instructions, when executed by one or more computing devices, further cause, responsive to expiration of the pre-existing reservation, immediately cancelling the pre-existing reservation.

32. The one or more non-transitory computer-readable media of claim 31, wherein the instructions, when executed by one or more computing devices, further cause, after expiration of the pre-existing reservation, cancelling the pre-existing reservation in response to a later-received reservation request if the pre-existing reservation would cause failure of the later-received reservation request.

33. The one or more non-transitory computer-readable media of claim 17, wherein:

the update is a percentage-based update that specifies a percentage; and the amount by which to increment or decrement the value is determined by the database server based, at least in part, on the percentage.

* * * * *